(12) United States Patent
Alvarez et al.

(10) Patent No.: US 12,530,628 B2
(45) Date of Patent: Jan. 20, 2026

(54) ANALYSING MACHINE-LEARNED CLASSIFIER MODELS

(71) Applicant: Qbox Corp Ltd, Farnborough (GB)

(72) Inventors: Benoit Alvarez, Oxford (GB); Marc Wickens, Wokingham (GB)

(73) Assignee: Qbox Corp Ltd, Farnborough (GB)

( * ) Notice: Subject to any disclaimer, the term of this patent is extended or adjusted under 35 U.S.C. 154(b) by 99 days.

(21) Appl. No.: 18/657,682

(22) Filed: May 7, 2024

(65) Prior Publication Data

US 2024/0296387 A1 Sep. 5, 2024

Related U.S. Application Data

(63) Continuation of application No. 17/046,367, filed as application No. PCT/GB2019/050979 on Apr. 4, 2019, now Pat. No. 12,008,442.

(30) Foreign Application Priority Data

Apr. 9, 2018 (GB) ..................... 1805871

(51) Int. Cl.

| G06N 20/00 | (2019.01) |
|---|---|
| G06F 18/20 | (2023.01) |
| G06F 18/2113 | (2023.01) |
| G06F 18/2413 | (2023.01) |
| G06F 18/2431 | (2023.01) |

(52) U.S. Cl.
CPC ......... *G06N 20/00* (2019.01); *G06F 18/2113* (2023.01); *G06F 18/2413* (2023.01); *G06F 18/2431* (2023.01); *G06F 18/29* (2023.01)

(58) Field of Classification Search
CPC ........ G06N 20/00; G06N 20/10; G06N 20/20; G06F 18/2113; G06F 18/2413; G06F 18/2431; G06F 18/29
See application file for complete search history.

(56) References Cited

U.S. PATENT DOCUMENTS

| 2006/0053172 A1 | 3/2006 | Gardner et al. |
| 2016/0092793 A1 | 3/2016 | Garrow et al. |
| 2017/0227995 A1 | 8/2017 | Lee et al. |

(Continued)

OTHER PUBLICATIONS

PCT International Search Report and Written Opinion for corresponding PCT Application No. PCT/GB2019/050979, mailed on Jul. 24, 2019, 12 pages.

*Primary Examiner* — Shane D Woolwine
(74) *Attorney, Agent, or Firm* — Boon Intellectual Property Law, PLLC; Brian S. Boon

(57) ABSTRACT

Methods and systems for analyzing machine-learned classifiers are disclosed herein. The method can include inputting a data item for processing by a machine-learned classifier model and receiving a plurality of confidence scores for a plurality of respective classes, the plurality of confidence scores having been generated by the machine-learned classifier model based on the data item. The method can also include determining a distance in dependence on a highest confidence score that is generated for the data item, and causing display of a class distribution diagram, where the class distribution diagram can illustrate a graphical representation corresponding to the data item located at the distance between the graphical representation of a first class and the graphical representation of a second class.

11 Claims, 15 Drawing Sheets

(56) References Cited

U.S. PATENT DOCUMENTS

| | | |
|---|---|---|
| 2018/0018576 A1 | 1/2018 | Boyer et al. |
| 2018/0046935 A1 | 2/2018 | Amershi |
| 2018/0357907 A1* | 12/2018 | Reiley .................... G08G 1/005 |
| 2019/0378044 A1* | 12/2019 | Jeffery .................... G06N 20/00 |

* cited by examiner

What training is available to me?

Returned intents

Intents are listed in the order returned. Their associated training questions are listed below.

| FIRST | SECOND |
|---|---|
| 75% | 29% |
| benefits_lynda | pc_pd_training |
| ○ | ○ |
| ~~How can I access Lynda?~~ | Can I learn some extra skills? |
| How do I log onto Lynda? | I want to have further training |
| Is Lynda free? | I would like to learn more skills in a new area |
| What is Lynda? | I would like to learn new skills |
| What online training is available? | Is there any training materials I can use? |
| What training does Lynda offer? | ~~What training is available to me?~~ |
| | Who do I speak to about specific training needs I have? |

*FIG. 7*

Can I learn some extra skills?

Returned intents

Intents are listed in the order returned. Their associated training questions are listed below.

| FIRST | (EXPECTED) | SECOND |
|---|---|---|
| 34% <br> pc_pd_training | | 13% <br> benefits_travelinsurance |
| | ○ | |
| ~~Can I learn some extra skills?~~ | | Am I covered by Volume when I travel with work? |
| I want to have further training | | Do I have travel insurance? |
| I would like to learn more skills in a new area | | Do we get travel insurance at Volume? |
| I would like to learn new skills | | Is travel insurance covered? |
| Is there any training materials I can use? | | What travel insurance benefits do I have? |
| What is available in the way of training? | | |
| What training is available to me? | | |
| Who do I speak to about specific training needs I have? | ○ | |

*FIG. 10*

Who do I speak to about specific training needs I have?

Returned intents

Intents are listed in the order returned. Their associated training questions are listed below.

| FIRST (EXPECTED) | SECOND |
|---|---|
| 42%<br>pc_pd_training | 23%<br>er_sickness |
| ○ | ○ |
| Can I learn some extra skills? | How do I report sickness? |
| I want to have further training | When do I have to tell someone I am ill? |
| I would like to learn more skills in a new area | Who do I contact when I am ill? |
| I would like to learn new skills | Who do I tell if I am ill? |
| Is there any training materials I can use? | Who do I tell that I am sick? |
| What is available in the way of training? | Who I report sickness to? |
| What training is available to me? | |
| ~~Who do I speak to about specific training needs I have?~~ | |

FIG. 11

Is there any training materials I can use?

Returned intents

Intents are listed in the order returned. Their associated training questions are listed below.

| FIRST | (EXPECTED) SECOND |
|---|---|
| 68%<br>pc_pd_training | 26%<br>benefits_gym |
| Can I learn some extra skills? | Are there any offers on gyms? |
| I want to have further training | Can I get gym discounts? |
| I would like to learn more skills in a new area | ~~How do I get my gym discount?~~ |
| I would like to learn new skills | How do I sign up for the gym with this discount? |
| I would like to learn some extra skills | Tell me about the gym |
| ~~Is there any training materials I can use?~~ | Where can I get gym discount? |
| What is available in the way of training? | |
| What training is available to me? | |
| Who can I ask about specific training needs? | |
| Who do I speak to about specific training needs I have? | |

FIG. 13

ANALYSING MACHINE-LEARNED CLASSIFIER MODELS

CROSS-REFERENCE TO RELATED APPLICATIONS

Priority is claimed in the application data sheet to the following patents or patent applications, each of which is expressly incorporated herein by reference in its entirety:
Ser. No. 17/046,367
PCT/GB2019/050979
GB 1805871.9

BACKGROUND

Field of the Art

This invention relates to analysing machine-learned classifier models. In particular, but not exclusively, it relates to analysing classifier models which have been trained to process natural language input.

Discussion of the State of the Art

Machine-learned classifier models find a variety of uses, including natural language understanding. A trained natural language processing classifier model (e.g. in a chatbot) may receive a natural language input and generate confidence scores for different possible ways in which the chatbot may respond to the received input. Such models have been developed using a variety of machine learning techniques including support vector machines and neural networks, and may be trained in accordance with various known training algorithms. The output of training, the machine-learned model itself, is usually seen as a "black box". That is, it can be very difficult to understand how a machine-learned model arrives at its conclusions, and consequently it can be difficult to diagnose issues with a machine-learned model which may be impacting on its performance.

SUMMARY

The present invention addresses the technical problem of how to understand and diagnose problems with machine-learned classifier models.

In an embodiment, a computer-implemented method is provided. The method comprises inputting a data item for processing by a machine-learned classifier model and receiving, in response to inputting the data item, a plurality of confidence scores for a plurality of respective classes, the plurality of confidence scores having been generated by the machine-learned classifier model based on the data item. The method further comprises determining a distance in dependence on a highest confidence score that is generated for the data item, and causing display of a class distribution diagram, wherein the class distribution diagram includes a graphical representation corresponding to a first class, a graphical representation corresponding to a second class, and a graphical representation corresponding to the data item, wherein the graphical representation corresponding to the data item is located at the distance between the graphical representation of the first class and the graphical representation of the second class.

The class distribution diagram that is thus generated provides a way of understanding performance of the machine-learned model, and can be used to diagnose problems with the machine-learned model. Significantly, the claimed method is also platform agnostic, i.e. it does not rely on the model being generated by a particular AI provider or AI platform. The claimed method can therefore be used to validate the quality and accuracy of a model irrespective of the software used to generate the model.

These are technical contributions to the field of machine learning.

The data item may comprise a validation data item or a test data item. The data item may be associated with a known expected class for the data item.

In various embodiments, the first class corresponds to the expected class for the data item. The distance may correspond to a distance from the graphical representation of the expected class in a direction towards the second class.

In an embodiment the machine-learned classifier model is a natural language processing model and the data item corresponds to natural language input.

In embodiments the claimed method may be used to visualise the performance of a particular class (e.g. a user selected class). Thus, in embodiments, the first class may be a user-selected class. Note that in embodiments in which the machine-learned classifier model is a natural language processing model, the term "intent" may be used to refer to a class.

In various embodiments the distance is calculated in dependence on whether the highest confidence score that is generated for the data item corresponds to an expected class for the data item.

The distance may be proportional to the highest confidence score that is generated for the data item, i.e. the distance may be calculated in accordance with a linear function of the highest confidence score.

The distance may be calculated as a proportion of the physical distance between the graphical representations for the first and second classes as displayed in the class distribution diagram.

The first class may correspond to the expected class for the data item. If a highest confidence score that is generated for the data item corresponds to an expected class for the data item, then the second class may correspond to the class associated with a second highest confidence score generated for the data item. However if a highest confidence score that is generated for the data item does not correspond to an expected class for the data item, then the second class may correspond to the class associated with a highest confidence score generated for the data item.

If a highest confidence score that is generated for the data item corresponds to the expected class for the data item, then the distance may be calculated in accordance with the following expression:

$$[(1-C)/(2-T)*D]$$

where C is the highest confidence score, T is a threshold value >0, and D represents the distance between the graphical representations of the first and second classes.

If a highest confidence score that is generated for the data item does not correspond to the expected class for the data item, then the distance is calculated in accordance with the following expression:

$$[(1-T+C)/(2-T)*D]$$

where C is the highest confidence score, T is a threshold value >0, and D represents the distance between the graphical representations of the first and second classes.

The graphical representation corresponding to the data item may be different (e.g. it may be of a different colour) depending on whether a highest confidence score that is generated for the data item corresponds to the expected class for the data item.

In embodiments the class distribution diagram may further comprises a graphical representation of a prediction threshold value.

The method may include inputting a plurality of data items for processing by a machine-learned classifier model; receiving, in response to inputting a data item, a plurality of confidence scores for a plurality of respective classes, the plurality of confidence scores having been generated by the machine-learned classifier model based on the data item; and generating data for a class distribution diagram, wherein generating the data comprises determining, for each data item, a distance in dependence on a highest confidence score that is generated for the data item.

The class distribution diagram may further comprise graphical representations corresponding to one or more respective further classes, and graphical representations corresponding to one or more further data items, wherein the graphical representations corresponding to the one or more further data items are respectively located at a respective distance between graphical representations of a respective pair of classes, the respective distance being calculated in dependence on a highest confidence score that is generated for the respective further data item.

In some embodiments the method includes processing the data item at the machine-learned classifier to generate the plurality of confidence scores for the plurality of respective classes.

BRIEF DESCRIPTION OF THE DRAWING FIGURES

So that the invention may be more fully understood, embodiments thereof will now be described, by way of example only, with reference to the accompanying drawings, in which:

FIG. 7 shows the detailed results of a query;

FIG. 10 shows the detailed results of a further query;

FIG. 11 shows the detailed results of yet a further query;

FIG. 13 shows the detailed results of yet a further query;

Figure 15:
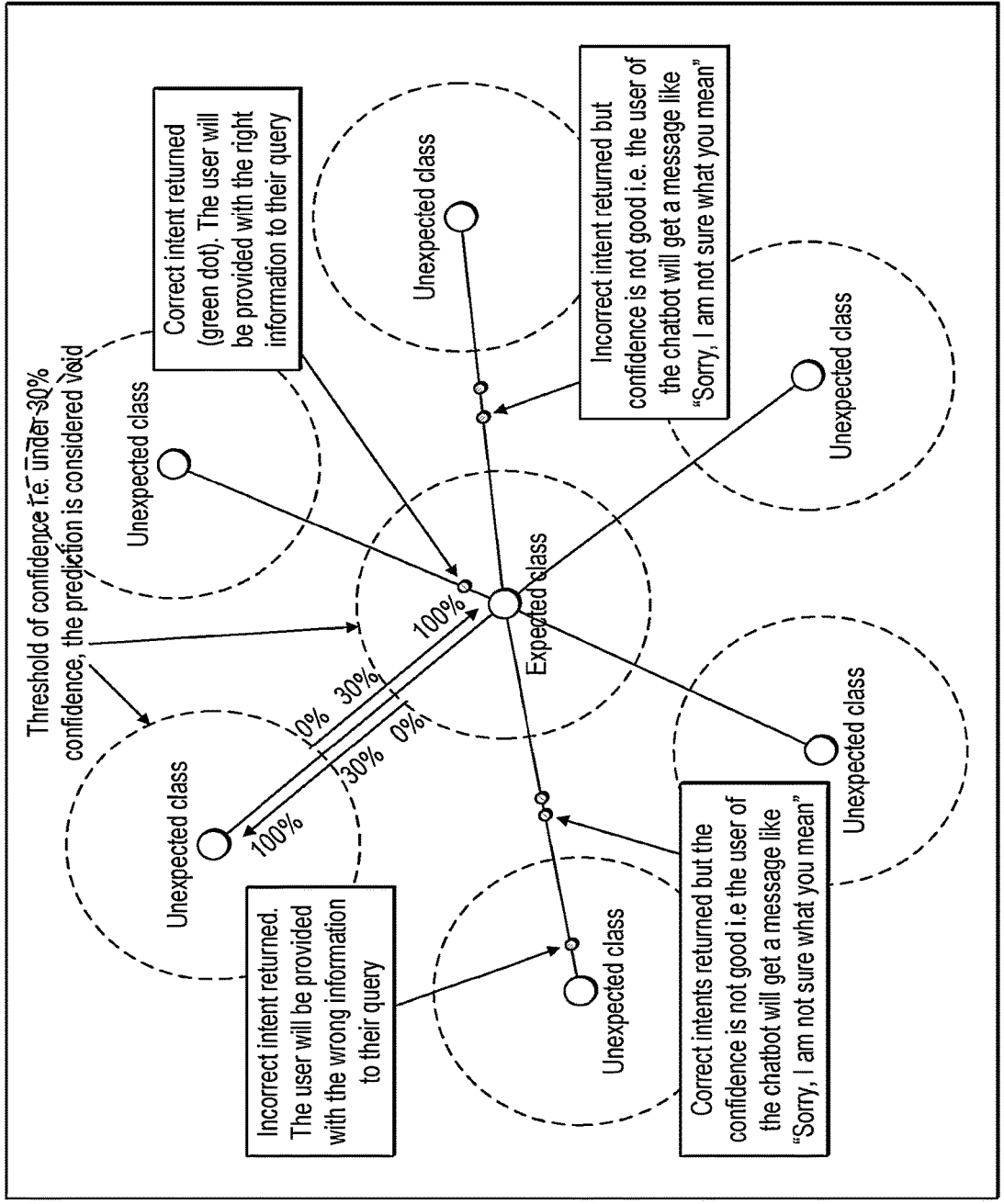

FIG. 15 schematically illustrates different features of class distribution diagrams as described herein.

DETAILED DESCRIPTION

Many artificial intelligence (AI) providers offer conversational platforms software as a service (SaaS). A user provides training data which is uploaded to the service and used to train a machine-learned classifier model. Users may use their training data to customise their end model, but as the number of "intents" (i.e. classes) increases, it becomes increasingly difficult for users to understand performance. Models may become unbalanced, i.e. one intent may begin to negatively impact on the performance of another, and this difficulty is increased if the amount of training data for each intent is low (e.g. fewer than 100 data items, or fewer than 25 or 30 data items). Conversational models based on natural language classifiers can be particularly sensitive to changes as they have low training data per class due the nature of language sentence examples (e.g. because there is not always a multiplicity of ways to ask a particular question). As users test the model, there is a need to cross check the classification performance of the model. Various embodiments described herein generate a visualisation in the form of a class distribution diagram, which can be used to identify poorly performing areas and prioritise them; a user is thus guided as to how to approach modifying the training data to solve issues and improve performance.

Figure 1:
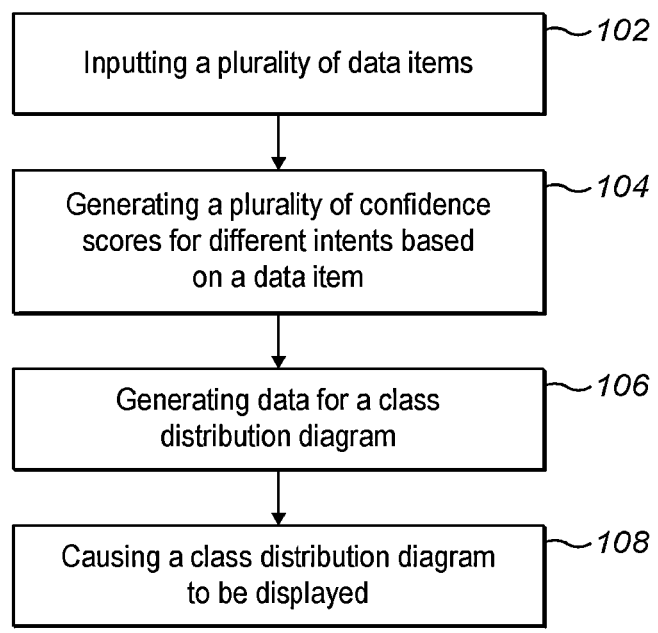
FIG. 1 illustrates a method for generating a class distribution diagram.

FIG. 1 illustrates a process for generating a class distribution diagram for a machine-learned classifier model in accordance with an example embodiment. The model may be trained using training data in accordance with one or more known techniques, the details of which are well known per se to those skilled in the art and will not be described here.

The machine-learned classifier model may comprise a natural language processing model. That is, the model may be configured to receive a natural language input generated by a user and produce a set of confident scores for different possible "intents" of the user, based on the natural language input thus, the intents correspond to classes into which the model categorises the natural language inputs that it receives. For example, an intent may correspond to a particular page to navigate to on a website.

Referring again to FIG. 1, a plurality of validation data items are input 102 for processing at the machine-learned classifier model. Each validation item may comprise a natural language input and may be associated with a known expected intent for that input.

In some embodiments, the machine-learned classifier model may be stored at a remote server, and the validation data items that are input may be sent to the remote server for processing. In other embodiments, the machine-learned classifier model may be stored locally, and the validation data items may be provided directly to the machine-learned classifier model.

For each validation data item, the machine-learned classifier generates 104 a plurality of confidence scores for different intents (classes) based on the validation data item. Next, data for a class distribution diagram is generated 106 using the confidence scores obtained for the validation data items.

Figure 2:
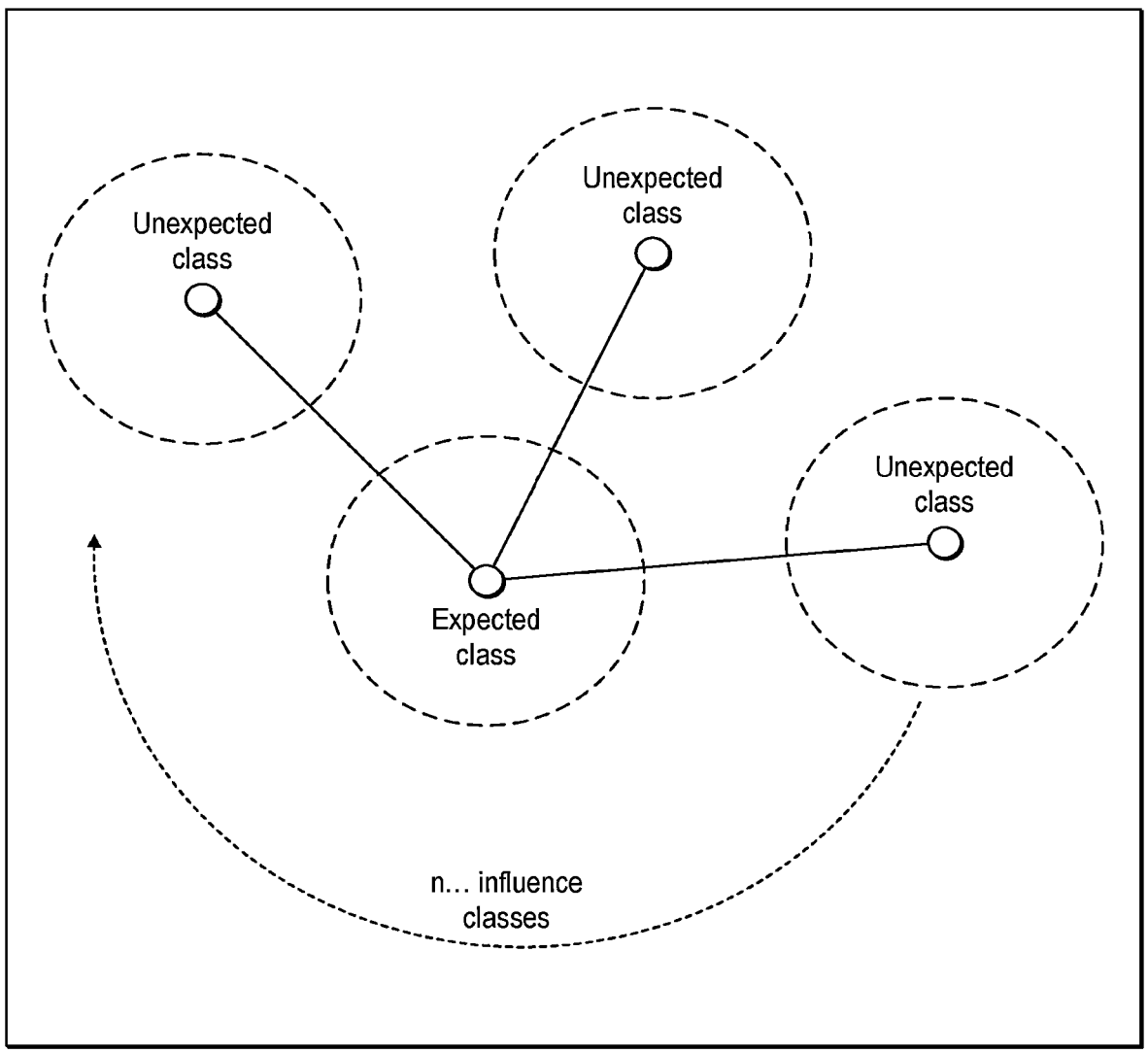
FIG. 2 is a schematic illustration of the structure of a class distribution diagram.

A class distribution diagram may be displayed 108 based on the generated data. In the class distribution diagram, a selected (e.g. user selected) intent may be represented as a node at the centre of the diagram, which is surrounded by one or more additional nodes representing nodes which negatively impact the performance of the selected intent. This is schematically illustrated in FIG. 2. Note that the number of additional nodes to display may be limited based on screen size/physical size of the diagram and/or a consideration of how much information should be provided to the user.

Figure 3:
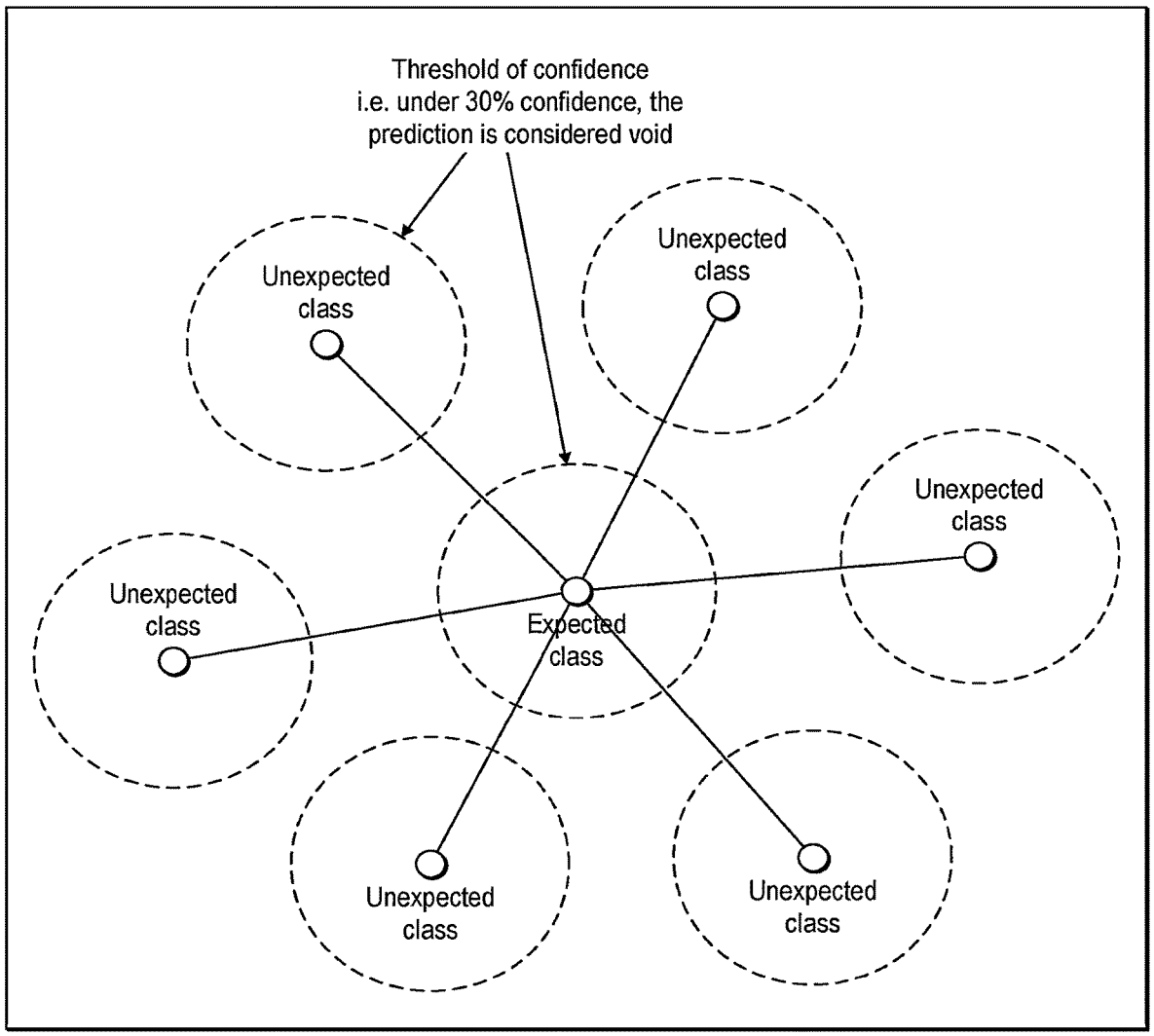
FIG. 3 is a schematic illustration of a class distribution diagram which includes graphical representation of a threshold value for each intent.

As shown in FIG. 3, a threshold value for each intent may be represented in the class distribution diagram, e.g. by a dotted circle. The threshold may be set per model and can vary depending on the risk on the prediction that the user requires. The threshold dictates the level at which the model is confident enough to make a prediction.

One or more of the validation data items may be displayed on the class distribution diagram. The validation data items which are displayed may comprise validation data items for which the expected intent corresponds to the selected, centrally positioned, intent. To display a data item, the following may be determined: 1) the highest confidence score generated for the data item 2) whether the highest confidence score corresponds to the expected intent for the data item; and 3) if the highest confidence score does not correspond to the expected class for the data item, the intent which obtained the highest confidence score. The highest confidence score for the one or more validation data items may then be mapped onto the diagram in accordance with the techniques described herein. In particular, for each validation data item, a direction, distance, and type of point may be determined, as follows:

Determining Direction

When asking for a prediction from a model, a list of possible classes is returned with its confidences. There are two possible use cases; first, the highest confidence is the expected correct prediction; second the highest confidence is an unexpected (so incorrect) prediction Case 1: the Model Provides the Expected Prediction:

Consider an example in which the prediction for a validation data item is:
Class X, confidence 0.56
Class V, confidence 0.32
Class B, confidence 0.11
Class N, confidence 0.02

Class X is the expected class for the validation data item, so that the model provides the expected prediction.

In this case the direction is defined by the second highest prediction (Class V). The validation data item will be visualised on a line that goes from a node representing the expected class (Class X) to a node representing the unexpected class V.

Case 2: the Model Provides an Unexpected Prediction:

Consider an example in which the prediction for a validation data item is:
Class N, confidence 0.56
Class V, confidence 0.32
Class B, confidence 0.11
Class X, confidence 0.02

Class X is the expected class for the validation data item, so that the model provides an unexpected prediction.

In this case, the direction will be defined by the highest prediction (Class N, which is incorrect). The validation data item will be visualised on a line that goes from a node representing the expected class (Class X) to a node representing the unexpected class N.

Determining Distance

The distance is calculated as a proportion of the physical distance "d" between nodes in the diagram. For each validation data item the data item distance (di) from the expected (i.e. central) node is calculated with the following formulas:

If the prediction is correct, then:

$$D_i = ((1 - C)/(2 - T)) * D$$

where C is the highest confidence score determined for the validation data item, expressed as a probability (i.e. between 0 and 1), T is a predetermined threshold value (e.g. 0.3), and "D" is the physical distance between nodes.

If the prediction is incorrect, then:

$$D_i = ((1 - T + C)/(2 - T)) * D$$

where T, C, and D are defined as per above.

Figure 4:
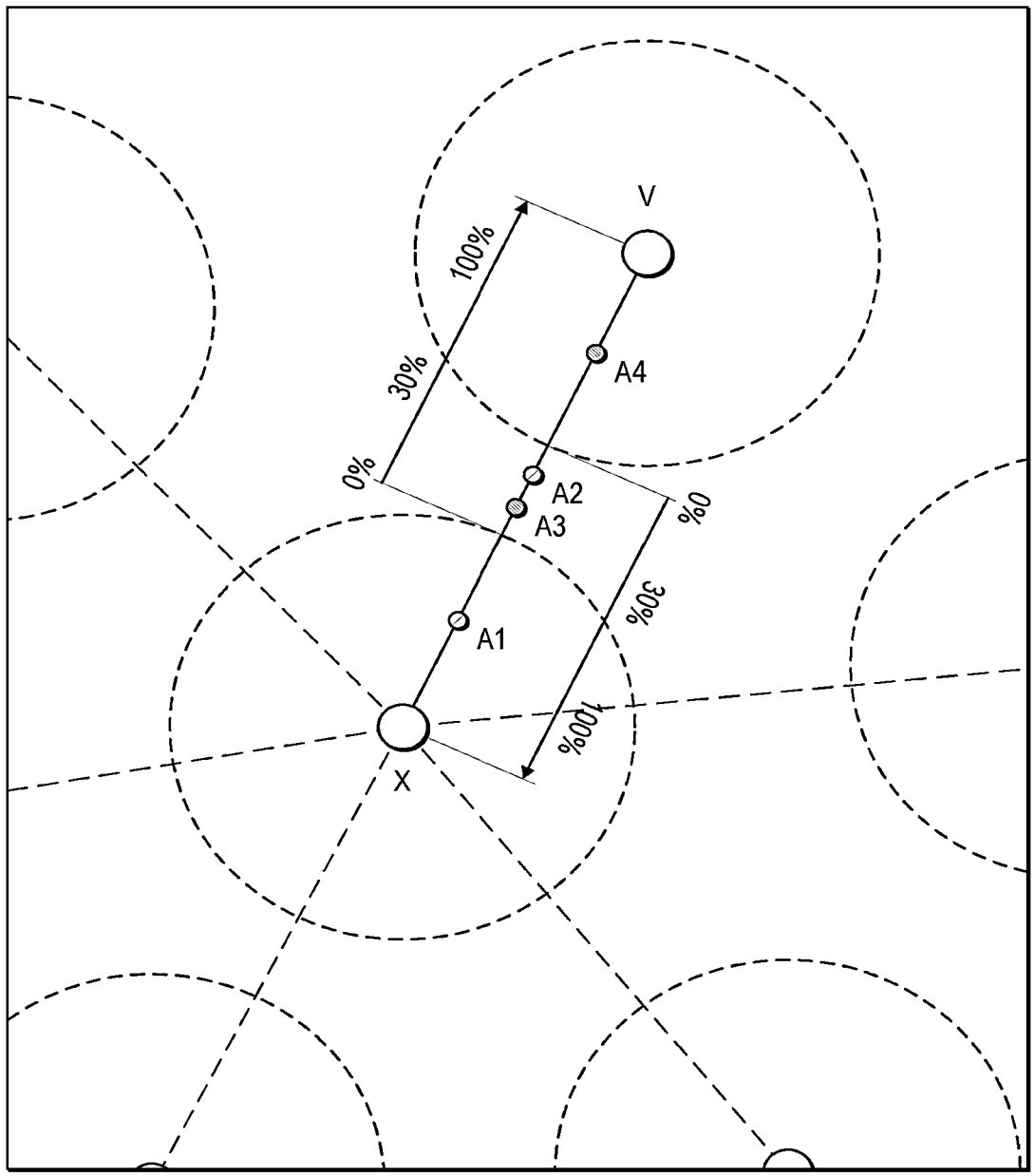
FIG. 4 is a schematic illustration of a class distribution diagram which includes graphical representations of validation data items.

In the example of FIG. 4, the threshold t is set at 0.3 (or 30%). The highest confidence score generated for data item A1 is 0.6 (or 60%) confidence and for validation data item A2 it is 0.1 (or 10%). For validation data item A3, the highest confidence score is 0.1 (or 10%) but for the wrong prediction. For validation data item A4, the highest confidence score is 0.6 (or 60%).

Type of Data Point

Figure 5:
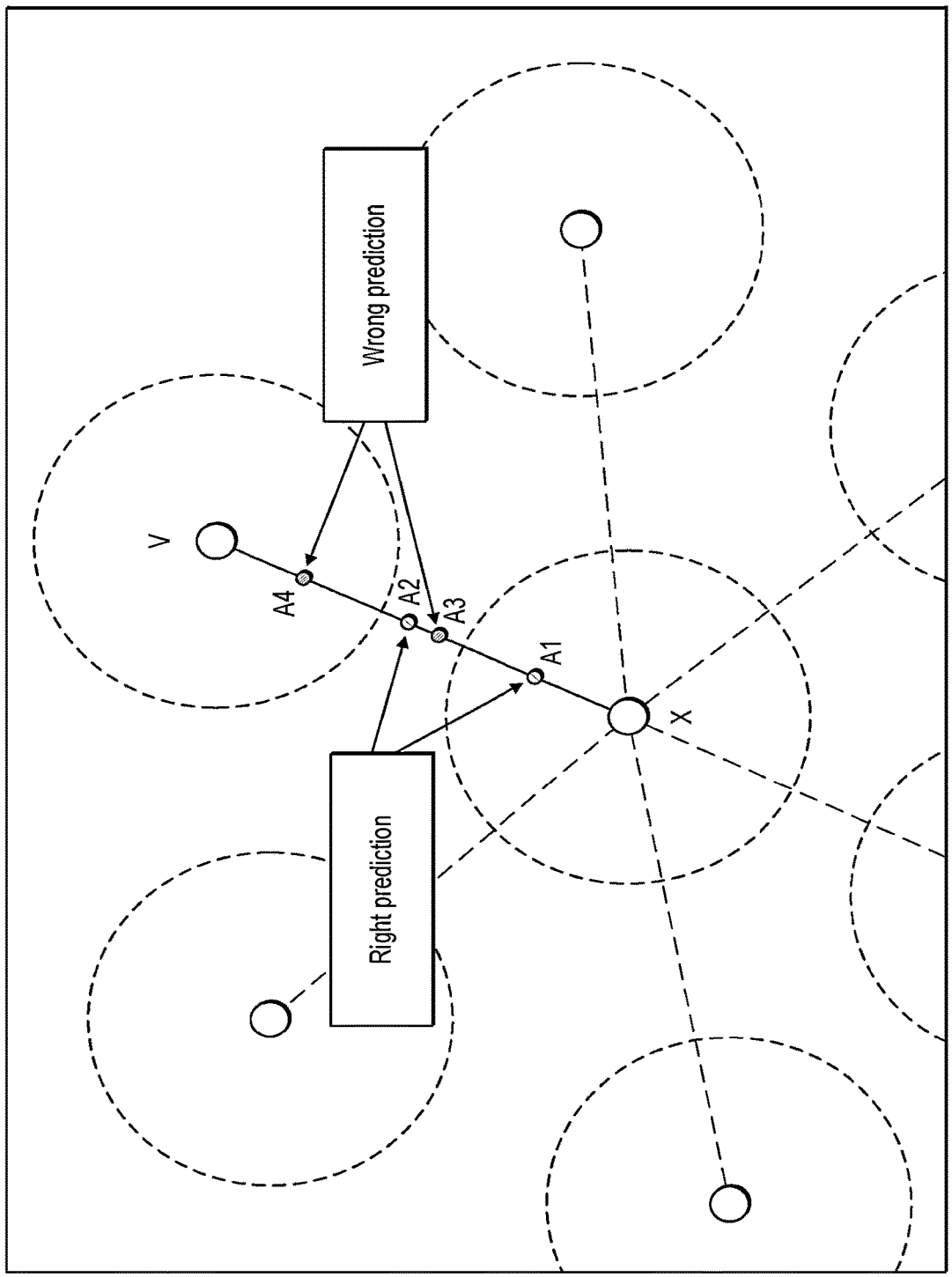
FIG. 5 illustrates different types of validation data item.

There are 2 types of validation data item (correct and incorrect prediction) that represent 4 states of output of the model. These are illustrated in FIG. 5. The four states are:

Correct prediction, above the threshold (A1). That means the model is correct and confident enough to provide the right output to the end user Correct prediction, below the threshold (A2). That means the model is correct but not confident enough in its prediction to provide the end user with an output Incorrect prediction, below the threshold (A3). That means the model is incorrect but not confident enough in its prediction to provide the end user with what would have been the wrong output Incorrect prediction, above the threshold (A4). That means the model is incorrect and confident enough so it will provide the wrong output to the end user The graphical representation corresponding to the validation data item may be different depending on whether the prediction is correct. For example, correct and incorrect predictions may be represented by different colours (e.g. green and red, respectively).

As will be evident from the foregoing, various embodiments provide a visualisation that represents an intent within a machine learned classifier model, and which shows, inter alia, which other intents are likely to negatively influence the performance of the intent. The class distribution diagram can be used to identify poorly performing areas and prioritise them; a user can then look at the content of the training data and validation data to solve issues and improve performance.

One problem which may be identified using the class distribution diagram is the presence of multiple classes with very similar training data. In this case the visualisation may show false negative data point(s) going to the unexpected class.

Another problem which may be identified may be one class being too "wide". In this case the visualisation may show a number of false negatives going to a number of unexpected classes. The solution would be to narrow the subject matter of the intent.

Another example could be if the visualisation shows just one or two false negatives going to one or two classes without real pattern. The problem here is likely to be a lack of definition of the concept described in the validation data point. Reinforcement on the training data around this point is likely to be the solution.

EXAMPLES

Figure 6:
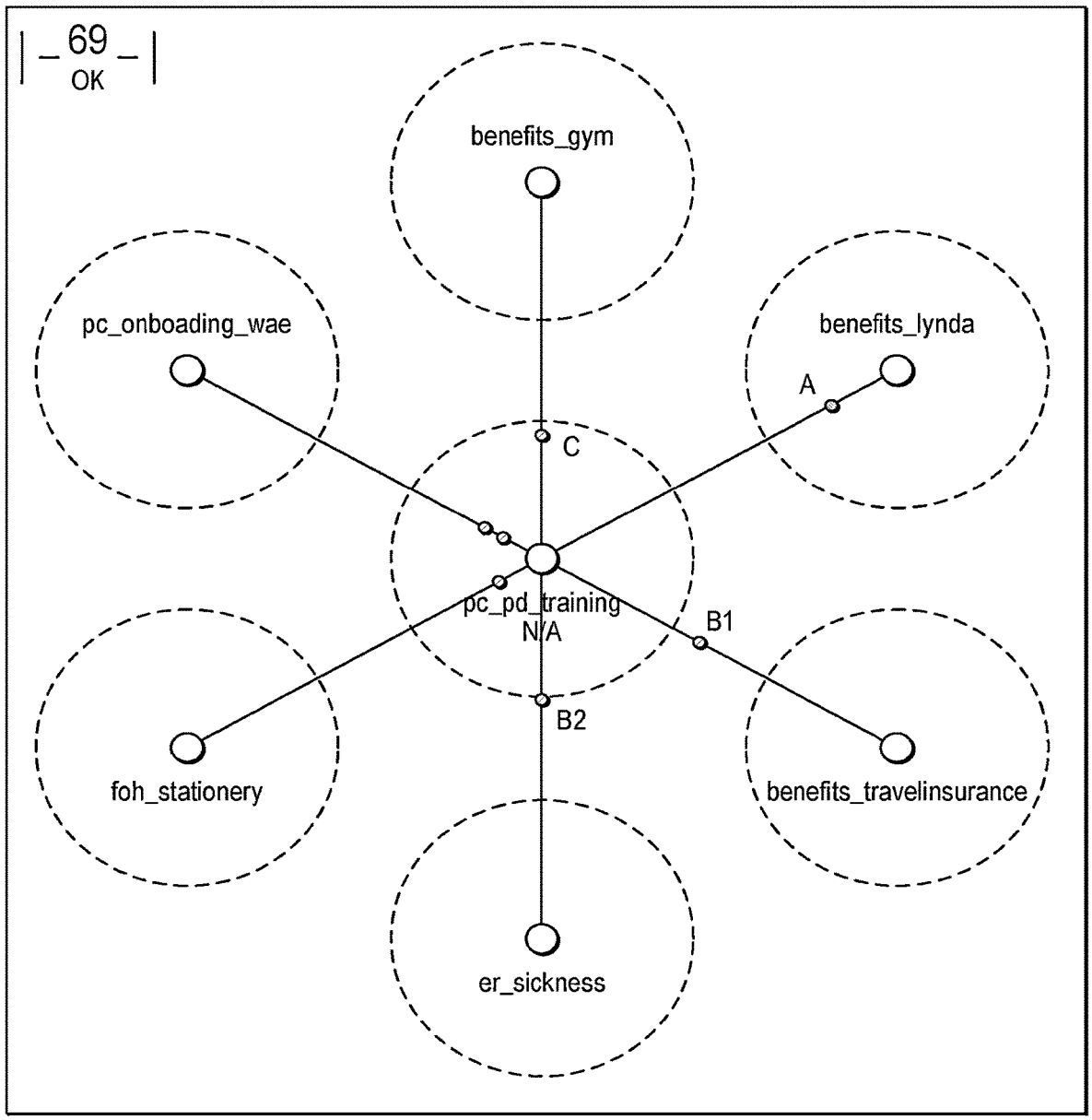
FIG. 6 illustrates an example class distribution diagram.

An exemplary class distribution diagram that is generated after running a validation on IO a class (intent) is shown in FIG. 6. Note that running a validation on a particular class means taking data items which are expected to return a certain class and asking a machine learning model to classify them to see whether that class is returned. The diagram thus reflects the results of certain queries that belong to the central intent (pc_pd_training) and where they sit with regards to their intent and confidence. The closer a point is to the centre of an intent, the closer to 100% confident the model is that the respective query belongs to that intent.

To give an example of how the class distribution diagram may be used, note that:

Cross validation data point A—"What training is available to me?"

This is a false negative for the intent of interest and has been attributed to the wrong intent "benefitsLynda" instead.

Cross validation data point B1—"Can I learn some extra skills?"

This has been attributed to the correct intent, but the confidence is below the threshold that the model was set for.

Cross validation data point B2—"Where do I speak to about training needs I have?"

This has been attributed to the correct intent, but the confidence is below the threshold that the model was set for.

Cross validation data point C—"Is there any training material for a course?"

This has been attributed to the correct intent, with confidence over the threshold, though only slightly. It may therefore be decided to train the model to increase the stability of the prediction for this query.

The initial training data for pc_pd_training is:
I want more training
I want to have further training
I wish to learn more skills
I would like to learn more skills in new area
I would love to learn new skills
The initial training data for benefitsLynda is:
How can I access Lynda?
How do I get onto Lynda?
How do I get log onto Lynda? 10 o What is Lynda?
What training does Lynda offer?

We can now work through the points A, B1, B2 and C in that order (by priority)

The detailed results for the query A-"What training is available to me?" are shown in FIG. 7. This shows that:

There is a confusion with the concept "training" between both intents

This indicates the concept of GENERAL TRAINING is weak and general training questions need to be strengthened in this intent. It could also indicate the intents are too close together, and so a better way of solving this issue may be to incorporate all questions about training into the one TRAINING intent, and then use an entity to branch off to Lynda training for all questions about online training and Lynda training.

Figure 8:
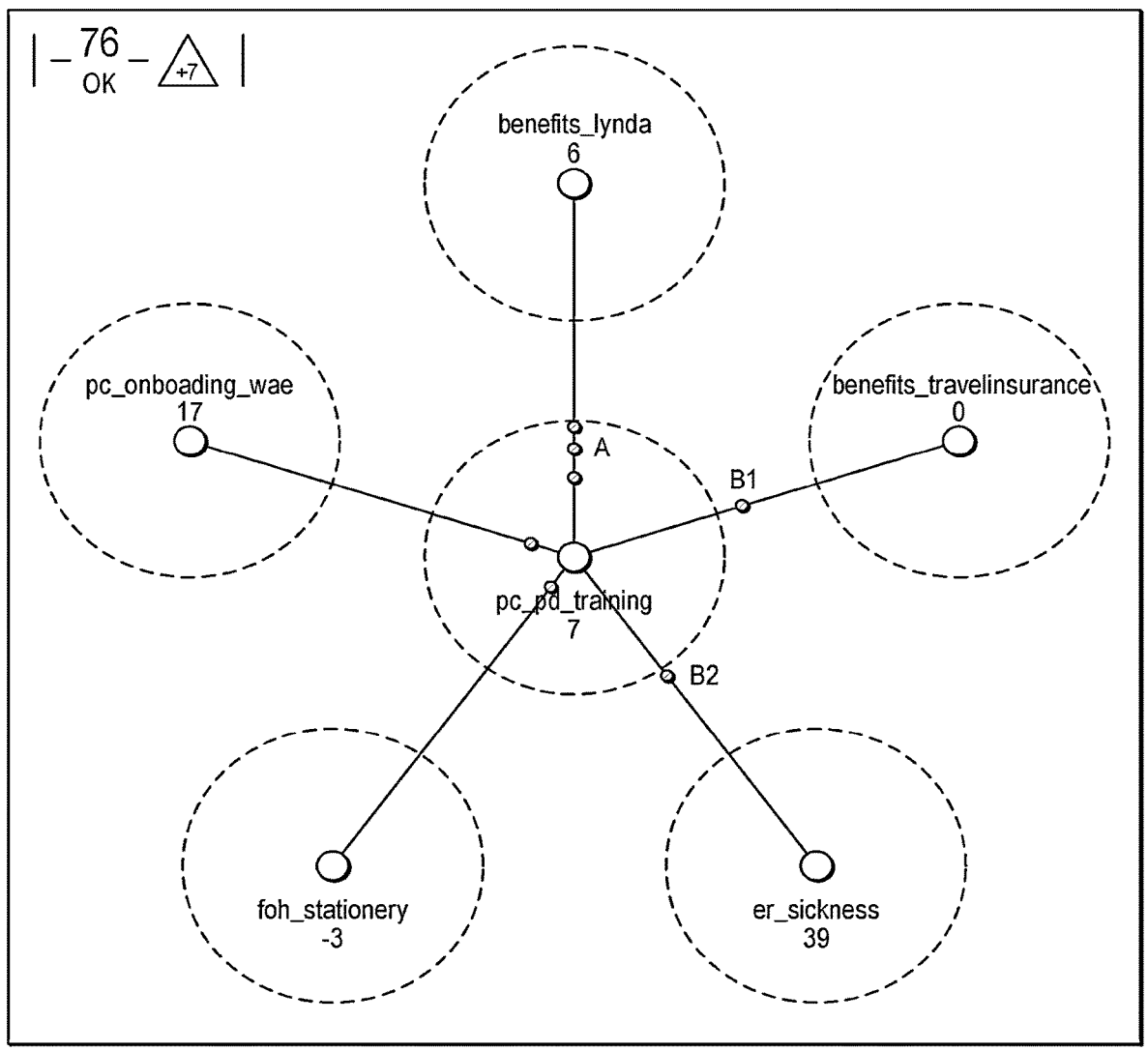
FIG. 8 shows an example of a class distribution diagram after retraining a model.
Figure 9:
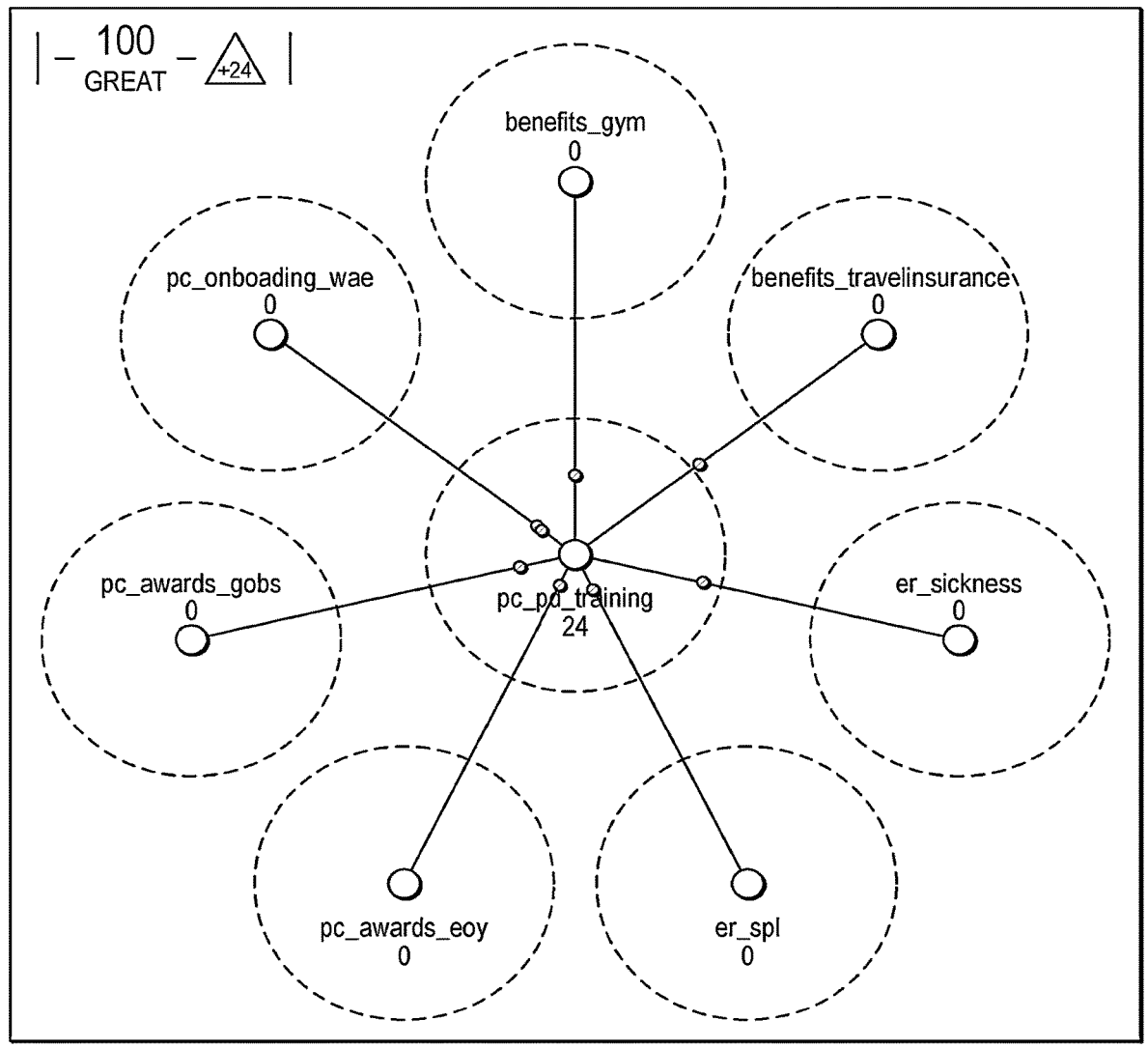
FIG. 9 shows an example of a class distribution diagram after further retraining a model.

To remedy the situation, the training data may be optimised to include another training data to represent the "Availability" concept with a training data such as "What is available in the pc_pd_training?". A class distribution diagram for the re-trained model is shown in FIG. 8. This shows us that the query of interest (Query A) has now shifted into the confidence threshold for pc_pd_training. However, there are still some points close to being below the threshold, leaning towards the benefitsLynda intent. This can be remedied by adjusting the training data to recognise that "Lynda", "Training website" and "online training" all refer to Lynda, whereas other instances of just "training" refer to the more generic "pc_pd_training" intent. A class distribution diagram for the re-trained model is shown in FIG. 9. We can also see that there is no major regression on any other training data points. As we can see, this training removes the issue of any queries having less confidence in pc_pd_training and drifting towards benefitsLynda as the latter no longer appears on the diagram.

The detailed results for the query BI-"Can I learn some extra skills?" are shown in FIG. 10.

An issue here is that there is an underrepresentation in the idea of "learning extra skills". This indicates that the data may be reinforced to include more training 10 examples of how "learning extra skills" can be used in a query, such as "I would like to learn some extra skills".

The detailed results for the query B2—"Where do I speak to about training needs I have?" are shown in FIG. 11.

This suggests that "training needs" may be reinforced through the addition of a query such as "Where can I ask about my training needs?"

Figure 12:
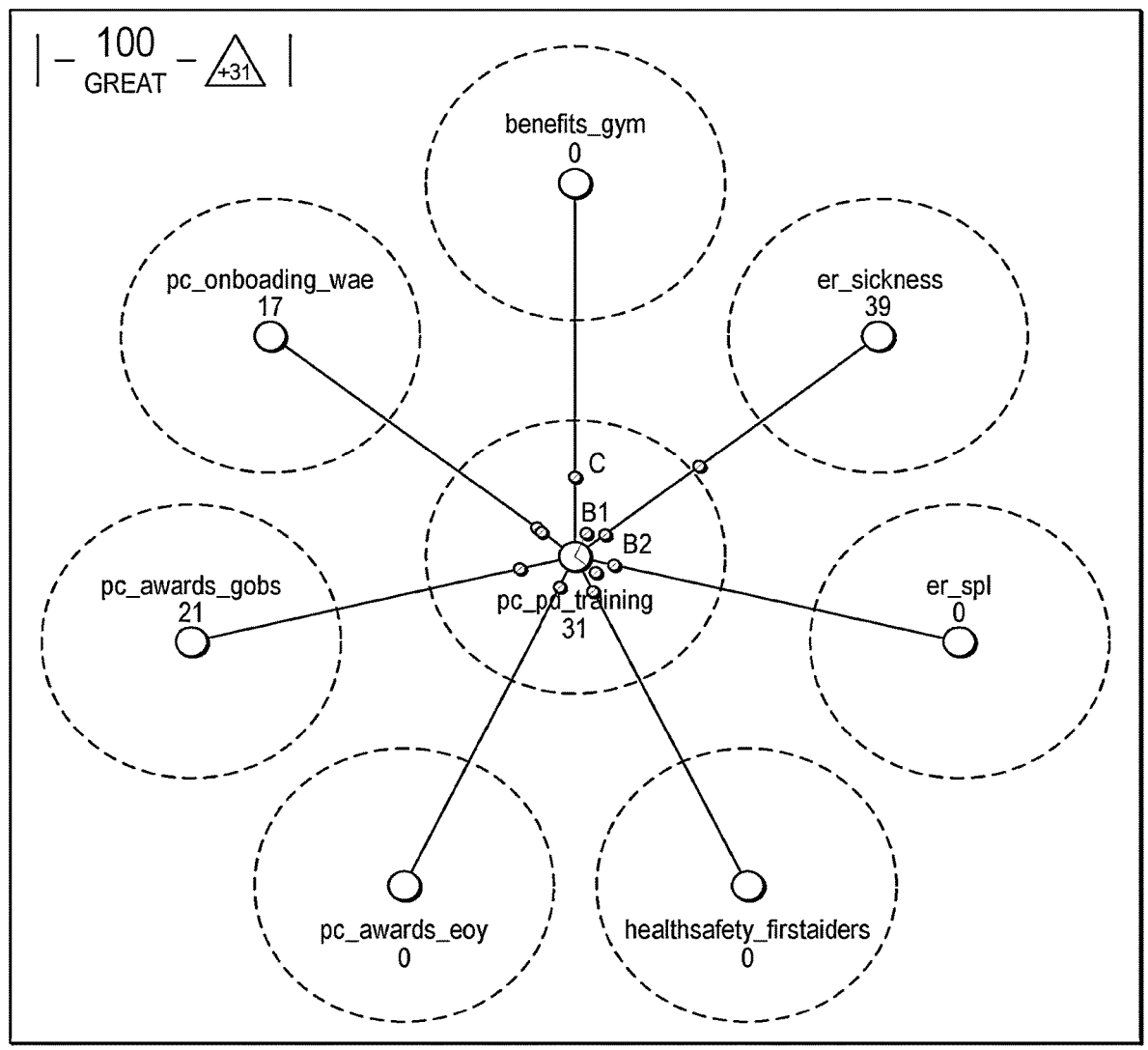
FIG. 12 shows a further example of a class distribution diagram after further refining a model.

The class distribution diagram generated after applying these changes to the training 20 data and retraining the model is shown in FIG. 12.

As shown, the queries now have high confidence within the intent they belong to. Note that the work on queries A, B1 and B2 has caused our C query (Is there any training material for a course?) to improve in confidence towards the correct intent. With a view to further optimisation, the detailed results for the query C may be considered. These are shown in FIG. 13.

Figure 14:
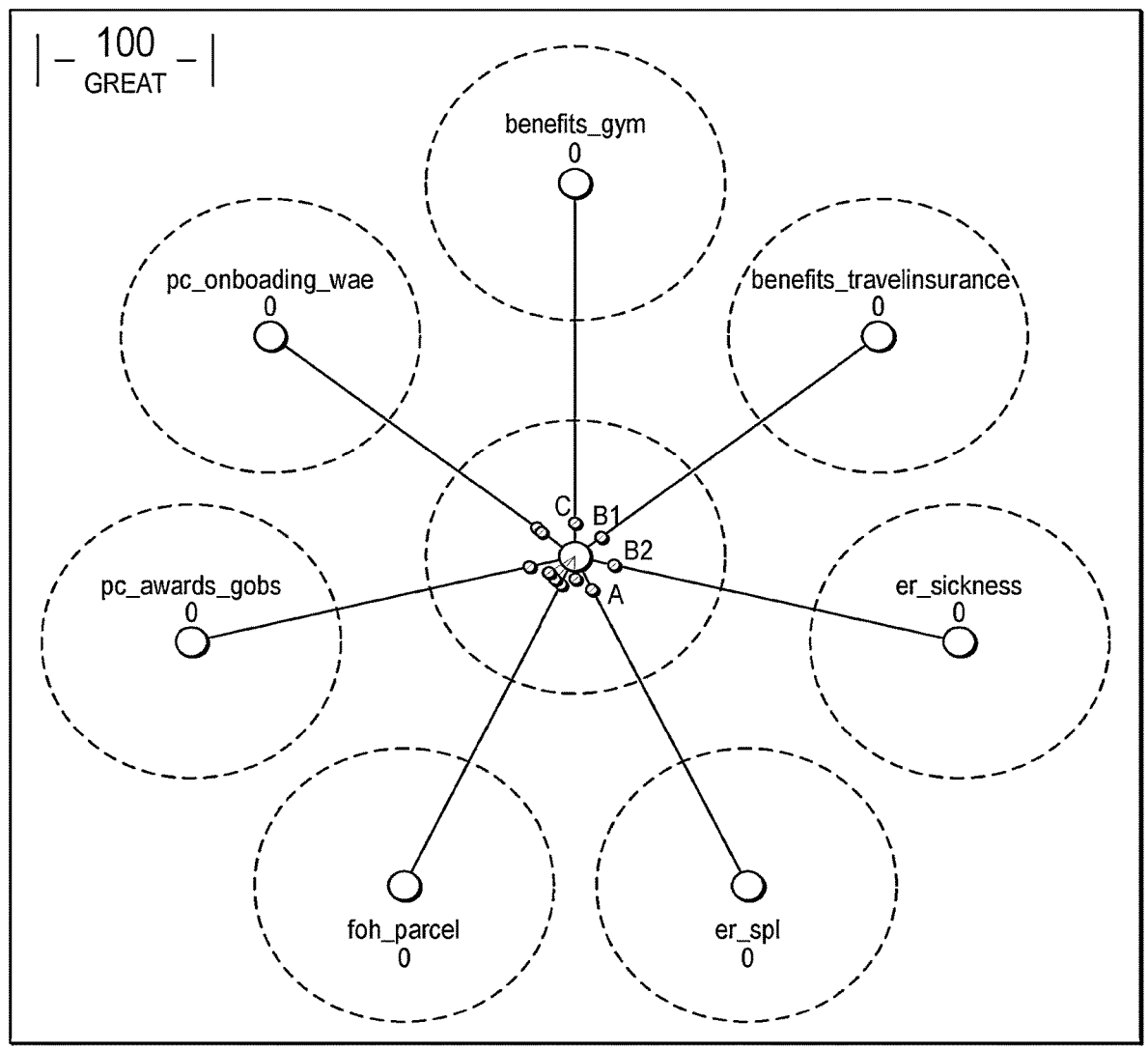
FIG. 14 shows a further example of a class distribution diagram after further refining a model.

If we add "Where can I find more training materials?" to the training data and retrain the model, the class distribution diagram appears as shown in FIG. 14. The queries 30 are now tightly clustered, with high confidence, in their correct intent. Also, the secondary intent for query A has changed from "benefitsLynda" to "crs p1" though the confidence in our primary intent is so high, this is negligible. We can see no regression to any other validation data points.

Reference is also directed to FIG. 15, in which various exemplary aspects of a class distribution diagram as discussed above are schematically illustrated.

As will be evident from the foregoing, generation of a class distribution diagram as described herein may be useful for:

Visualising performance at the specific intent level
Identifying areas of performance and weaknesses
Helping to prioritise where the model need more work
Allowing a user to view context by drilling down into the training data at intent level
Comparing the performance from one visualisation to the other
Validating that the solution has fixed the performance weakness
Checking that a solution has not generated regression Generation of a class distribution diagram may be particularly useful to improve the performance of imbalanced models with low levels of training data per class. The visualisation positions each validation data item for a class in relation to the other classes in the model. Thus, the user can see what other classes in the model influence the prediction quality and accuracy of the class being tested.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nontransitory program carrier for execution by, or to control the operation of, data processing apparatus.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes.

Many further modifications and variations will be evident to those skilled in the art, that fall within the scope of the following claims.

What is claimed is:

1. A computer-implemented method for validating machine-learned classifier models, comprising the steps of:
    inputting a validation data item to a trained machine-learned classifier model;
    receiving from the trained machine-learned classifier a plurality of classes for the validation data item and a confidence score for each class, wherein each class represents a possible classification by the trained machine-learned classifier of the validation data item based on the trained machine-learned classifier's training;
    selecting a first class of the plurality of classes for analysis;
    calculating a distance, D, between the first class and each other class of the plurality of classes based in part on a highest confidence score of the confidence scores for each class; and
    generating a class distribution diagram comprising a graphical representation of the distance, D, calculated between the first class and each other class of the plurality of classes.

2. The computer-implemented method of claim 1, wherein the machine-learned classifier model is a natural language processing model and wherein the validation data item corresponds to natural language input.

3. The computer-implemented method of claim 1, wherein each distance, D, calculated depends on whether the highest confidence score that is generated for the validation data item corresponds to an expected class for the validation data item.

4. The computer-implemented method of claim 1, wherein each distance, D, is calculated in accordance with a linear function of a highest confidence score that is generated for the validation data item.

5. The computer-implemented method of claim 1, wherein the distance, D, calculated between the first class and each other class is calculated as a proportion of a physical distance between graphical representations of the first class and that other class as displayed in a display of the class distribution diagram.

6. The computer-implemented method of claim 1, wherein the selection of the first class and selection of a second class of the plurality of classes are made according to the following rules:
- if the highest confidence score that is generated for the validation data item corresponds to an expected class for the validation data item, then the first class corresponds to the expected class and the second class corresponds to the class associated with a second highest confidence score generated for the data item; and
- if the highest confidence score that is generated for the validation data item does not correspond to the expected class for the validation data item, then the first class corresponds to the expected class and the second class corresponds to the class associated with the highest confidence score generated for the validation data item.

7. The computer-implemented method of claim 6, wherein a validation data item distance, Di, is calculated along the axis of each distance, D, from the first class to the second class according to the following rules:
- if the first class corresponds to the expected class for the validation data item and corresponds to the highest confidence score that is generated for the validation data item, then the validation data item distance, Di, is calculated along the axis, D, from the first class to the second class in accordance with the following expression:

$$C*(1-T)*D,$$

where C is the highest confidence score, T is a threshold value between 0 and 1, and D represents the distance between the representations of the first class and the corresponding other class; and
- if the first class corresponds to the expected class for the validation data item, but does not correspond to the highest confidence score that is generated for the validation data item does not correspond to the expected class for the validation data item, then the validation data item distance, Di, is calculated along the axis, D, from the first class to the second class in accordance with the following expression:

$$[(1-T+C)/(2-T)]*D,$$

where C is the highest confidence score, T is a threshold value between 0 and 1, and D represents the distance between the representations of the first class and corresponding other class.

8. The computer-implemented method of claim 7, further comprising the steps of retraining the machine-learned classification model by:
- identifying a confusion in terminology by comparing training data associated with the first class to training data associated with the second class;
- generating a first set of new training data configured to resolve the confusion by adding a new concept; and
- retraining the machine-learned classification model using the first set of new training data.

9. The computer-implemented method of claim 8, further comprising the steps of retraining the machine-learned classification model by:
- identifying a plurality of phrases which are similar in meaning but are identified by the machine-learned classification model as having different meanings;
- generating a second set of new training data configured to identify the plurality of phrases as having the same meaning; and
- retraining the machine-learned classification model using the second set of new training data.

10. A non-transitory computer readable medium that stores computer readable instructions, which when executed by a computing apparatus, cause the method of claim 1 to be performed.

11. Apparatus configured to carry out the method of claim 1.

* * * * *